United States Patent Office 3,375,306
Patented Mar. 26, 1968

3,375,306
METHOD OF PRODUCING DENSE, SINTERED BODIES OF $UO_2$ OR $UO_2$-$PuO_2$ MIXTURES
Lewis Eric Russell, Oxford, John David Lawrence Harrison, Chilton, and Norman Harry Brett, Hathersage, near Sheffield, England, assignors to United Kingdom Atomic Energy Authority, London, England
No Drawing. Continuation of application Ser. No. 106,185, Apr. 28, 1961. This application Jan. 11, 1965, Ser. No. 424,822
Claims priority, application Great Britain, Apr. 29, 1960, 15,240/60
5 Claims. (Cl. 264—.5)

ABSTRACT OF THE DISCLOSURE

A method of producing dense sintered bodies of either uranium dioxide or a mixture of uranium dioxide and plutonium dioxide comprising pressing a powder to form a compact, heating the compact at a temperature of from 1300° C. to 1600° C. in a sintering atmosphere which is either carbon dioxide or carbon dioxide containing carbon monoxide and cooling the sintered body in a reducing atmosphere which, in the case where the body is uranium dioxide, is dry hydrogen, wet hydrogen or a mixture of carbon dioxide and carbon monoxide and, in the case where the body is mixed uranium and plutonium dioxides, is wet steam or carbon dioxide mixed with carbon monoxide. In this way, a sintered body having a ratio of oxygen to metal atoms from 1.98:1 to 2.02:1 and a density in excess of 95% of the theoretical density is obtained.

---

This application is a continuation of our copending application Ser. No. 106,185, filed Apr. 28, 1961, and now abandoned, and the invention relates to the production of sintered uranium dioxide, and sintered mixtures thereof with plutonium dioxide.

It has been discovered that uranium dioxide and mixtures thereof with plutonium dioxide may be sintered to very high densities by heating to a temperature of 1300° C. or above in an atmosphere of carbon dioxide, and that in the case of mixtures containing from 10% to 30% plutonium dioxide particularly high densities can be obtained by heating at such temperatures in a mixture of carbon dioxide and carbon monoxide.

According to the present invention, a method of producing a dense sintered body consisting of uranium dioxide or a mixture thereof with plutonium dioxide comprises heating a compacted body of uranium dioxide or a mixture thereof with plutonium dioxide to a temperature of at least 1300° C. in an atmosphere consisting of carbon dioxide or a mixture thereof with carbon monoxide.

Also according to the invention, a method of producing a dense sintered body consisting of a mixture of 10% to 30% plutonium dioxide and correspondingly 90% to 70% uranium dioxide comprises heating a compacted body consisting of the said mixture to a temperature of at least 1300° C. in an atmosphere consisting of a mixture of carbon dioxide and carbon monoxide in which the ratio of carbon monoxide to carbon dioxide is in the range from 1:100 to 100.1.

The optimum ratio of carbon monoxide to carbon dioxide in order to give the highest density depends on the proportion of plutonium dioxide in the mixture, but is within the range from 1:100 to 1:10 for 10% plutonium dioxide, and within the range from 1:20 to 1:1 for 30% plutonium dioxide, the optimum ratios for plutonium dioxide proportions between 10% and 30% being intermediate in range.

The optimum temperature for sintering in pure carbon dioxide varies with the period at the sintering temperature. Maximum densities are attained by sintering for 3 to 6 hours at 1300° to 1550° C., the density falling off slightly thereafter. At 1600° C., or above however, the same maximum density is attained within a few minutes but then falls off rather rapidly.

The sintering temperature in mixtures of carbon monoxide and dioxide is not so critical, but is preferably in the range 1400° C. to 1600° C.

A stoichiometric oxide product, that is, a product in which the ratio of oxygen atoms to metal atoms is substantially 2.00:1, may be produced by cooling the sintered material in a reducing atmosphere. Such an atmosphere may consist of pure hydrogen in the case of pure uranium dioxide, but for mixtures of uranium dioxide and plutonium dioxide hydrogen containing a partial pressure of steam, or a mixture of carbon dioxide and carbon monoxide, is preferred, since dry hydrogen reduces some of the plutonium to the trivalent state and thus lowers the oxygen/metal ratio below 2:1. Uranium is not reduced below the tetravalent state by hydrogen.

The ratio of carbon monoxide to carbon dioxide during cooling should be within the range from 1:10 to 100:1, the upper limit of monoxide being set by the decomposition of carbon monoxide to give carbon which occurs at high temperatures when the carbon dioxide content of the mixture is less than about 1%. If the ratio of carbon monoxide to carbon dioxide is less than 1:10, then the oxygen/metal ratio will rise substantially higher than 2.00:1.

In specifying an oxygen/metal ratio of substantially 2.00:1 a ratio within the range from 1.98:1 to 2.02:1 is contemplated.

It is possible to select a ratio of carbon monoxide to carbon dioxide such that sintering and cooling can be carried out in the same atmosphere to achieve both the highest possible density and an oxygen/metal ratio of substantially 2.00:1. Alternatively, the ratio may be changed between sintering and cooling.

One advantage of the method of this invention is that the necessity for heating at temperatures above 1600° C., such as are necessary for sintering in an inert atmosphere or in hydrogen, can be avoided.

A further advantage is that it avoids the need for heating the compact slowly in the range 100° to 400° C., which is necessary for binder removal in air before sintering in an inert atmosphere or hydrogen, as described in United States Patent No. 3,194,852.

The invention is of particular value for producing dense sintered bodies containing from 10% to 30% plutonium dioxide, such as are suitable for use in a fast neutron nuclear reactor. Sintering of compacts containing 10% to 30% plutonium dioxide in an atmosphere consisting of a mixture of carbon dioxide and carbon monoxide produces bodies which are not of high density, but are substantially chemically homogeneous as regards uranium and plutonium, even if the original compacts consisted of discrete particles of uranium dioxide and plutonium dioxide.

The nature of the invention, and the methods by which it is to be performed, will become more apparent from the following examples:

EXAMPLE 1

50 gm. plutonium dioxide powder and 450 gm. uranium dioxide powder were milled together in a polythene bottle containing porcelain balls for 16 hours at 100 r.p.m. Then 50 ml. of a 60% (by weight) solution of polybutyl methacrylate in toluene were added as binder and the mixture was passed through a sieve to give free-flowing granules. After drying, the granules were pressed into pellets 0.375 inch in diameter and weighing 4.5 gm. each by double-end pressing at 30 tons per sq. in. The green density of the pellets was 6.3 gm./cc. The pellets were then heated at the rate of 400° C. per hour to 1500° C. in an atmosphere of pure carbon dioxide and kept at 1500° C. for 4 hours. After cooling in the same atmosphere, the pellets were found to have a sintered density of 10.6 gm./cc., which is 96% of the theoretical density of a homogeneous mixture of 10% $PuO_2$ and 90% $UO_2$. The sintered material was found to consist of a solid solution of plutonium and uranium oxides, with an oxygen/metal ratio of 2.14 to 1.

EXAMPLE 2

Pellets containing 1% plutonium dioxide and 99% uranium dioxide were produced by a similar process to that described in Example 1, but with a maximum temperature in carbon dioxide of 1400° C. The density of the sintered pellets was found to be 10.6 gm./cc., which is 96.5% of theoretical. In the sintered material, however, only 25% of the plutonium oxide was in solid solution with the uranium oxide.

EXAMPLE 3

Pellets consisting entirely of uranium dioxide were produced by a similar process to that described in Example 1, but after sintering in carbon dioxide to 1550° C. were cooled in hydrogen. The density of the sintered pellets was 10.6 gm./cc., which is 96.5% theoretical, and the oxygen/metal ratio of the product was 2.00 to 1.

EXAMPLE 4

Pellets consisting of 1% plutonium dioxide and 99% uranium dioxide were produced by a similar process to that described in Example 2, but after sintering in carbon dioxide were cooled in hydrogen. The density of the sintered pellets was found to be 10.6 gm./cc., as in Example 2.

EXAMPLE 5

Pellets consisting of 10% plutonium dioxide and 90% uranium dioxide were produced as described in Example 1, but after sintering in carbon dioxide with a maximum temperature of 1550° C. for 4 hours were cooled in dry hydrogen to 950° and kept at this temperature for 4 hours before cooling to room temperature in dry hydrogen. The dry hydrogen contained less than 1 part in 10,000 of water vapour. The sintered pellets had a density of 10.5 gm./cc. which is 95% of theoretical, consisted of a solid solution of plutonium and uranium oxides, and had an oxygen/metal ratio of 1.985 to 1.

EXAMPLE 6

Pellets consisting of 10% plutonium dioxide and 90% uranium dioxide were produced as described in Example 5, except that the dry hydrogen was replaced by hydrogen which had been saturated with water vapour at room temperature, i.e., which contained about 1% water vapour. The sintered pellets had a density of 10.6 gm./cc., which is 96% of theoretical, consisted of a solid solution of plutonium and uranium oxides, and had an oxygen/metal ratio of 2.00 to 1.

EXAMPLES 7 TO 11

Pellets consisting of 10% plutonium dioxide and 90% uranium dioxide were prepared as in Example 5, except that the dry hydrogen was replaced by mixtures of carbon dioxide and carbon monoxide containing varying proportions of carbon monoxide, as shown in the following table, which also shows the densities of the sintered pellets and the oxygen/metal ratio for the products of each example.

| Ex. | $CO/CO_2$ during cooling | Density of product Gm./cc. | Percent Theoretical | Oxygen/metal ratio in product |
|---|---|---|---|---|
| 7 | 1:100 | 10.7 | 97 | 2.12 |
| 8 | 1:10 | 10.6 | 96 | 2.005 |
| 9 | 1:1 | 10.6 | 96 | 1.985 |
| 10 | 3:1 | 10.6 | 96 | 1.985 |
| 11 | 100:1 | 10.6 | 96 | 1.985 |

A substantially stoichiometric oxygen/metal ratio is attained with a $CO/CO_2$ ratio between 1:10 and 100:1. The products of Examples 7 to 11 all consisted of solid solutions of plutonium and uranium oxides.

EXAMPLES 12–14

Pellets consisting of 10% plutonium dioxide and 90% uranium dioxide were produced as described in Example 1, but were sintered in mixtures of carbon dioxide and carbon monoxide in which the ratios of monoxide to dioxide were as shown in the following table, with a maximum temperature of 1500° C. for 4 hours, and were then cooled in an atmosphere of pure carbon dioxide. The table also shows the densities of the sintered pellets and the oxygen/metal ratios for the products of each example, including Example 1 for comparison.

| Ex. | $CO/CO_2$ ratio during sintering | Density of product Gm./cc. | Percent theoretical | Oxygen/metal ratio in product |
|---|---|---|---|---|
| 1 | Pure $CO_2$ | 10.6 | 96 | 2.14 |
| 12 | 1:100 | 10.9 | 99 | 2.14 |
| 13 | 1:10 | 10.9 | 99 | 2.14 |
| 14 | 1:1 | 10.85 | 98.5 | 2.14 |

The maximum density for pellets containing 10% plutonium dioxide is achieved with a ratio of carbon monoxide to carbon dioxide in the range 1:100 to 1:10. The products of Examples 12 to 14 all consisted of solid solutions of plutonium and uranium oxides.

EXAMPLE 15

Pellets consisting of 10% plutonium dioxide and 90% uranium dioxide were produced as described in Example 13, except that the atmosphere during cooling was the same as that during sintering, i.e., a mixture of carbon dioxide and carbon monoxide in which the ratio of monoxide to dioxide was 1:10. The sintered pellets had a density of 10.7 gm./cc., which is 97% of theoretical, and an oxygen/metal ratio of 2.00:1, thus showing the combination of maximum density and stoichiometric oxygen/metal ratio.

EXAMPLES 16–20

Pellets consisting of 30% plutonium dioxide and 70% uranium dioxide were produced by a similar process to that described in Example 1, but were sintered at 1500° C. for 4 hours and then cooled, in atmospheres consisting of pure carbon dioxide, or mixtures of carbon dioxide and carbon monoxide in which the ratios of monoxide to dioxide were as shown in the following table. The table also shows the densities of the sintered pellets and the oxygen/metal ratios for the products of each example.

| Ex. | $CO/CO_2$ ratio sintering and cooling | Density of product Gm./cc. | Percent theoretical | Oxygen/metal ratio in product |
|---|---|---|---|---|
| 16 | Pure $CO_2$ | 10.4 | 92.5 | 2.14 |
| 17 | 1:100 | 10.5 | 94 | 2.12 |
| 18 | 1:20 | 10.6 | 95 | 2.04 |
| 19 | 1:10 | 10.7 | 96.5 | 2.02 |
| 20 | 1:1 | 10.65 | 96 | 2.00 |

The maximum density for pellets containing 30% plutonium dioxide is achieved with a ratio of carbon monoxide to carbon dioxide in the range 1:20 to 1:1, and that the combination of maximum density and stoichiometric oxygen/metal ratio is achieved by sintering and cooling with a ratio of carbon monoxide to carbon dioxide in the range 1:10 to 1:1. The products of Examples 16 to 20 all consisted of solid solutions of plutonium and uranium oxides.

We claim:
1. A method of producing dense, sintered bodies selected from the group consisting of bodies of uranium dioxide and a mixture of uranium dioxide and plutonium dioxide, said method comprising the steps of pressing particulate material selected from the group consisting of uranium dioxide and mixtures of uranium dioxide and plutonium dioxide to form a compacted body of said material; heating said compacted body to a temperature of from 1300° C. to 1600° C. in a sintering atmosphere consisting essentially of an atmosphere selected from the group consisting of carbon dioxide, and carbon dioxide in admixture with carbon monoxide, to sinter said body at said temperature; and cooling the sintered body in a reducing atmosphere consisting essentially of an atmosphere selected from the group consisting of dry hydrogen, hydrogen containing a partial pressure of steam, and carbon dioxide in admixture with carbon monoxide when said body is uranium dioxide, and selected from the group consisting of hydrogen containing a partial pressure of steam and carbon dioxide in admixture with carbon monoxide when said body is a mixture of uranium dioxide and plutonium dioxide; said cooled sintered body having a ratio of oxygen to metal atoms of from 1.98:1 to 2.02:1 and a density of at least 10.5 g./cm.$^3$.

2. A method according to claim 1 wherein said material is uranium dioxide and wherein said sintering atmosphere is carbon monoxide and carbon dioxide in admixture, the ratio of carbon monoxide to carbon dioxide being from 1:100 to 100:1.

3. A method according to claim 2 wherein the reducing atmosphere is carbon dioxide and carbon monoxide in admixture, the ratio of carbon monoxide to carbon dioxide being from 1:10 to 100/1.

4. A method according to claim 1 wherein said material is a mixture of uranium dioxide and plutonium dioxide, said plutonium dioxide being present in an amount of from 10 to 30% of said mixture, and wherein said sintering atmosphere is carbon dioxide and carbon monoxide in admixture, the ratio of carbon monoxide to carbon dioxide being from 1:100 to 1:1.

5. A method according to claim 4 wherein the reducing atmosphere is carbon dioxide and carbon monoxide in admixture, the ratio of carbon monoxide to carbon dioxide being from 1:10 to 100/1.

References Cited
UNITED STATES PATENTS

| | | | |
|---|---|---|---|
| 2,906,598 | 9/1959 | Googin | 23—355 |
| 3,051,566 | 8/1962 | Schwartz | 264—.5 |
| 3,063,793 | 11/1962 | Rawson et al. | 252—301.1 |
| 3,081,249 | 3/1962 | Whittemore | 264—.5 |
| 3,087,876 | 4/1963 | Henderson et al. | 264—.5 |
| 3,141,782 | 7/1964 | Livey et al | 264—.5 |
| 3,194,852 | 7/1965 | Lloyd et al. | 264—.5 |

OTHER REFERENCES

AEC Documents: (1) HW–60276, April 1959, page 8; (2) TID–7546, BK2, November 1957, pages 420, 422, 434–436, 471 and 474–477.

Proceedings of Second U.N. Int., Conf., vol. 6, 1958, pages 599, 600, 609, 610, 617–619 and 626–628.

L. DEWAYNE RUTLEDGE, *Primary Examiner.*